United States Patent Office 3,239,557
Patented Mar. 8, 1966

3,239,557
PROCESS FOR CONVERTING HALIDES TO ESTERS
Ross Wade Fasick, Wilmington, Del., assignor to E. I. du Pont de Nemours and Company, Wilmington, Del., a corporation of Delaware
No Drawing. Filed Jan. 18, 1962, Ser. No. 167,151
4 Claims. (Cl. 260—486)

This invention is directed to a process for converting halides having the structure $R_fCH_2CH_2Y$ (Y=Br or I) to esters having the structure $R_fCH_2CHO_2CR$.

The halides $R_fCH_2CH_2Y$ are readily available. This series of compounds forms a potentially valuable series of intermediates if suitable means can be provided for converting them to other, useful products. One such type of product is the corresponding esters $R_fCH_2CH_2O_2CR$. A method has been described for converting these halides to esters which involves reaction with a metal carboxylate, using the corresponding acid as solvent. While useful to some extent for preparing esters of saturated esters, the process is limited in its use for preparing unsaturated esters of the acrylic type by the polymerization of both the ester products and the unsaturated acid solvent during the reaction. Addition of polymerization inhibitors, e.g. hydroquinone, alleviates this disadvantage to some extent but yield losses to polymers remain prohibitively high.

Another known method for converting the halides to esters involves reaction with the silver salt of the acid. While yields are, in some cases, good, the reaction is slow and the expense of reconverting the product silver halide to a useful form of silver makes the process economically unattractive. Naturally silver is too expensive not to recover and reuse.

It is therefore an object of this invention to provide a novel process for converting halides having the structure $R_fCH_2CH_2Y$ to esters having the structure $$R_fCH_2CH_2O_2CR$$

Y is Br or I. It is another object to provide such a process which gives the esters in significantly high yields. It is still another such object to provide a novel process which uses relatively inexpensive reagents, said process being one which does not cause unsaturated esters to polymerize. A still further object is to provide significantly useful esters. These and other objects will become evident hereinafter.

More specifically, the present invention is directed to a novel process for converting halides having the structure $X(C_nF_{2n})CH_2CH_2Y$ to esters having the structure $Z(C_nF_{2n})CH_2CH_2O_2CR$ wherein X is fluorine or —$CH_2CH_2Y$, Y is bromine or iodine, Z is fluorine or $RCO_2CH_2CH_2$—; the radical $RCO_2$— is the residue of a hydrocarbon mono or polycarboxylic organic acid free of nucleophilic substituents and $n$ is from one to about 16; said process comprising heating the halides $$X(C_nF_{2n})CH_2CH_2Y$$

with alkali metal carboxylates $MO_2CR$ in an anhydrous monohydric alcoholic solvent having a dielectric constant of less than about 17.5 at 25° C., at a reaction temperature of from about 125° to about 200° C. for from about one to about 30 hours under autogenous pressure and recovering the ester $Z(C_nF_{2n})CH_2CH_2O_2CR$ from the reaction mixture; M is an alkali metal as hereinafter described and claimed.

For the purposes of this invention, a nucleophilic substituent is one that reacts with an organic molecule containing a displaceable substituent by either direct displacement of the group as a stable molecule or anion or by hydrogen abstraction from a carbon adjacent to that bearing the displaceable substituent with subsequent loss of the group as a stable molecule or anion. In the former case, the substituent becomes attached to the organic molecule while in the latter the organic molecule is converted to an olefin. Examples of nucleophilic substituents are amino groups, mercapto and sulfide groups, and the anions of alcohols, phenols and mercaptans.

The novel process of the present invention consists in reacting the halides $X(C_nF_{2n})CH_2CH_2Y$ (Y=Br or I) with alkali metal salts of organic, mono and polycarboxylic acids to form esters $Z(C_nF_{2n})CH_2CH_2O_2CR$. The halides $X(C_nF_{2n})CH_2CH_2Y$ differ from the other well known perfluoroalkyl halides $C_nF_{2n+1}Y$ and $$C_nF_{2n+1}CH_2Y$$

in that they show a strong tendency to dehydrohalogenate to olefins in the presence of nucleophilic reagents, i.e. to $X(C_nF_{2n})CH=CH_2$, whereas the others cannot. The halides $X(C_nF_{2n})CH_2CH_2Y$ also differ from ordinary alkyl halides $C_nH_{2n+1}CH_2CH_2Y$ in that the former dehydrohalogenate much more readily than do the latter. For example, ethyl and butyl iodides react with the strongly nucleophilic trimethyl, triethyl and tributyl amines to form the corresponding ammonium salts whereas the iodides $X(C_nF_{2n})CH_2CH_2I$ react to form the olefins $X(C_nF_{2n})CH=CH_2$. The iodides $C_nF_{2n+1}$ and $$C_nF_{2n+1}CH_2I$$

do not react at all. For this reason, it is difficult to cause the halides $X(C_nF_{2n})CH_2CH_2Y$ to undergo displacement reactions with alkali metal carboxylates. The art methods for alkyl halides, i.e. using lower alcohols, tetrahydrofuran, water or dimethylformamide as solvents, result in large proportions of the halides being converted to olefins. This is illustrated in the representative examples which follow. It has been discovered however that if the reaction is carried out in a monohydric alcohol which has a dielectric constant of less than about 17.5 at 25° C., olefin is not formed or is formed only to a very minor extent. This is distinctly contrary to what would be expected on theoretical grounds which predict that more olefin would be formed in solvents of lower dielectric constant (see, for example, Ingold, "Structure and Mechanism in Organic Chemistry," Cornell University Press, 1953, Ithaca, N.Y., chapter VIII, p. 453.).

Experience has shown that the reaction of the halides $X(C_nF_{2n})CH_2CH_2Y$ with alkali metal salts of unsaturated acids, e.g. acrylic, methacrylic or like acids, using the corresponding acid as the solvent results, when carried out at higher temperatures, in a large proportion of the resulting product being polymeric in nature. This is highly undesirable, even if the esters are intended for preparing polymers ultimately, because there is no control over the nature of the polymer. The use of polymerization inhibitors does not solve this problem. The use of acids corresponding to the salts as solvents suffers from a second defect, namely it is limited to those acids which are liquid under the reaction conditions. Also, many acids, particularly the polybasic types, can not be heated when highly concentrated because they tend to form anhydrides and water. The use of acids also presents a corrosion problem, thus limiting the type of equipment which can be employed.

The present novel process is carried out by heating a mixture, generally a solution, of the halide $$X(C_nF_{2n})CH_2CH_2Y$$

an alkali metal mono or polycarboxylate and the alcohol solvent at from 125° to about 200° C. for from one to about 30 hours under autogenous pressure and recovering the ester from the reaction mixture. The halide $X(C_nF_{2n})CH_2CH_2Y$ may contain from three to about 18 carbons. Although all values of $n$ are useful in the present process, the preferred species, based on utility of the resulting products, are those where $n$ is from 3 to about 14. Typical starting halides include $CF_3CH_2CH_2I$, $$CF_3(CF_2)_2CH_2CH_2I$$
$$CF_3(CF_2)_3CH_2CH_2I$$
$$CF_3(CF_2)_5CH_2CH_2I$$
$$CF_3(CF_2)_6CH_2CH_2I$$
$$CF_3(CF_2)_7CH_2CH_2I$$
$$CF_3(CF_2)_9CH_2CH_2I$$
$$CF_3(CF_2)_{11}CH_2CH_2I$$
$$ICH_2CH_2CF_2CF_2CH_2CH_2I$$
$$ICH_2CH_2(CF_2CF_2)_2CH_2CH_2I$$
$$ICH_2CH_2(CF_2CF_2)_3CH_2CH_2I$$
$$ICH_2CH_2(CF_2CF_2)_4CH_2CH_2I$$
$$ICH_2CH_2(CF_2CF_2)_5CH_2CH_2I$$
$$ICH_2CH_2(CF_2CF_2)_6CH_2CH_2I$$
$$CF_3CH_2CH_2Br$$
$$CF_3(CF_2)_2CH_2CH_2Br$$
$$CF_3(CF_2)_3CH_2CH_2Br$$
$$CF_3(CF_2)_5CH_2CH_2Br$$
$$CF_3(CF_2)_6CH_2CH_2Br$$
$$CF_3(CF_2)_7CH_2CH_2Br$$
$$CF_3(CF_2)_9CH_2CH_2Br$$
$$CF_3(CF_2)_{11}CH_2CH_2Br$$
$$BrCH_2CH_2CF_2CF_2CH_2CH_2Br$$
$$BrCH_2CH_2(CF_2CF_2)_2CH_2CH_2Br$$
$$BrCH_2CH_2(CF_2CF_2)_3CH_2CH_2Br$$
$$BrCH_2CH_2(CF_2CF_2)_4CH_2CH_2Br$$
$$BrCH_2CH_2(CF_2CF_2)_5CH_2CH_2Br$$

$BrCH_2CH_2(CF_2CF_2)_6CH_2CH_2Br$ and the like.

Other polyfluoroalkyl halides which may be used in the practice of the present invention are those which contain branched-chain alkyl groups, e.g.

$$(CF_3)_2CF(CF_2)_4CH_2CH_2I$$

or Br $$(CF_3)_2CF(CF_2)_6CH_2CH_2I$$

or Br $$(CF_3)_2CF(CF_2)_8CH_2CH_2I$$

or Br $$CF_3(CF_2)_2[CF_2CF(CF_3)]_2CH_2CH_2I$$

or Br and $CF_3(CF_2)_2[CF_2CF(CF_3)]_3CH_2CH_2$ or Br. Additional polyfluoroalkyl halides which may be used in this invention have the formula $H(CF_2CF_2)_mCH_2CH_2I$ and Br, $Cl(CF_2CF_2)_mCH_2CH_2I$ and Br and $Br(CF_2CF_2)_m$—$CH_2CH_2I$ and Br. The physical properties of some of the useful starting materials follows:

| Compound: | Boiling Point ° C./mm. Hg |
|---|---|
| $CF_3CH_2CH_2I$ | 90/760. |
| $CF_3(CF_2)_2CH_2CH_2I$ | 62/100. |
| $CF_3(CF_2)_3CH_2CH_2I$ | 138°–140°/760. |
| $CF_3(CF_2)_5CH_2CH_2I$ | 180°/760. |
| $CF_3(CF_2)_6CH_2CH_2I$ | 73/8. |
| $CF_3(CF_2)_7CH_2CH_2I$ | M.P. 55–56°. |
| $CF_3(CF_2)_9CH_2CH_2I$ | M.P. 82–83°. |
| $ICH_2CH_2CF_2CF_2CH_2CH_2I$ | M.P. 112.5–113.5. |
| $CF_3(CF_2)_2CH_2CH_2Br$ | 97.8/747. |
| $BrCH_2CH_2(CF_2CF_2)_2CH_2CH_2Br$ | M.P 53.5–54.5. |
| $BrCH_2CH_2(CF_2CF_2)_3CH_2CH_2Br$ | 82/1.0. |

The iodides $F(C_nF_{2n})CH_2CH_2I$ are prepared by the method of Haszeldine et al., J. Chem. Soc., 2856 (1949); 3041 (1950), and Park et al. J. Org. Chem., 23, 1166 (1958), i.e. by thermal or photo-chemical addition of $F(C_nF_{2n})I$ to ethylene. Various types of iodides $F(C_nF_{2n})I$ are prepared by the methods of Haszeldine, Nature, 167, 139 (1951); Hauptschein et al., JACS, 79, 2549 (1957) or Lazerete et al., Canadian Patent 583,873. The iodides $$ICH_2CH_2(C_nF_{2n})CH_2CH_2I$$

are available by the reaction of $I(C_nF_{2n})I$ with ethylene according to the methods of Brace (S.N. 90,911, filed February 23, 1961 and S.N. 57,388, filed September 21, 1960, allowed June 9, 1961). The iodides $I(C_nF_{2n})I$ are available by the method of Haszeldine, Nature supra. The bromides $F(C_nF_{2n})CH_2CH_2Br$ and $$BrCH_2CH(C_nF_{2n})CH_2CH_2Br$$

are available by the method of Smeltz (S.N. 36,706, filed June 17, 1960), by addition of $F(C_nF_{2n})Br$ and $Br(C_nF_{2n})Br$ to ethylene. The starting bromides $F(C_nF_{2n})Br$ and $Br(C_nF_{2n})Br$ are available by the methods of Hauptschein et al., JACS, 80, 851 (1958) or Lazerte supra.

The alkali metal carboxylates which may be used in the practice of the present invention are usually the lithium, sodium or potassium salts. The rubidium and cesium salts can be used but they are more expensive. The acids must be free of nucleophilic substituents. Thus, they must be free of mercapto, sulfide and amino groups as well as the salts of alcohols, mercaptans and phenol groups. Other less common nucleophilic groups such as phosphino, arsino and the like should also be absent. Nitrogen heterocyclic compounds should also be absent. Nitrogen heterocyclic compounds containing basic nitrogen should also be absent, e.g. derivatives of pyridine and its relatives. Salts of the following acids may be utilized: formic, acetic propionic, butyric, pivalic, valeric, caproic, pelargonic, caprylic, capric, lauric, myristic, palmitic, stearic, enanthic, hexahydrobenzoic, camphoric, acrylic, methacrylic, alphachloroacrylic, crotonic, tiglic, vinylacetic, oleic, undecylenic, brassidic, succinic, glutaric, adipic pimelic, suberic, azelic, sebacic, maleic, fumaric, citraconic, benzoic, nitrobenzoic, napthoic phenylacetic, naphthylacetic, phthalic, isophthalic, terphthalic, chlorobenzoic, toluic, cinnamic, trimellitic, trimesic, pyrometallic, naphthalic (1,4 and 1,8) and the like. Of this group, the alkali metal salts, and particularly the potassium salts, of acrylic and methacrylic acids are preferred since they lead to the more valuable esters.

The alcohols which are useful as solvents must have a dielectric constant of less than about 17.5 at 25° C. This group includes: n-amyl, n-hexyl, n-octyl, sec.-butyl, n-butyl, isobutyl, tert.-butyl, isoamyl, tert.-amyl, n-heptyl, benzyl, alpha-phenylethyl, beta-phenylethyl n-nonyl, n-decyl, n-dodecyl, n-tetradecyl, cetyl, and octadecyl alcohols as well as 2-heptanol, 3-heptanol, 4-heptanol, 2-pentanol, 3-pentanol, 3-methylpentanol-3, cyclohexanol, triethylcarbinol, 2-, 3- and 4-methyl-1-cyclohexanols, 2-, 3- and 4-octanols, 2-, 3-, 4-, 5- and 6-methyl-1-heptanols, 2-, 3-, and 4-methyl-4-heptanols, 1,2,3,4-tetrahydro-2-naphthol, 2-ethyl-1-hexanol and the like. All of the above have dielectric constants of less than 17.5 to 25° C. The tertiary alcohols of the group and particularly tertiary amyl alcohol are preferred. Mixtures of these alcohols with the organic acids involved can be used, provided the dielectric constant remains below 17.5, but the use of mixtures is much less desirable.

As noted heretofore, when the dielectric constant is below 17.5, little or no olefin is formed as a by-product. If an alcoholic solvent having a dielectric constant higher than 17.5 is used, the amount of olefin by-product formed increases as the dielectric constant increases. This is demonstrated in Examples I and V. Example I shows that alcohols with dielectric constants less than 17.5 give yields better than 80%. Example V shows that ethanol, which has a dielectric constant greater than 17.5 gives only a 50% yield. Example V also shows that the dielectric constant consideration only applies to alcohols since tetrahydrofuran, with a very low dielectric constant, gives a very poor yield.

The reaction is carried out at 125 to 200° C., usually under autogenous pressure. Depending on the particular starting materials and solvents used, the pressure may or may not be greater than one atmosphere. In general, and particularly with the preferred solvent tertiary amyl alcohol, the reaction pressure will exceed one atmosphere. When this is the case, the reaction must be carried out in a sealed vessel. The reaction takes from one to 30 hours depending on the particular alkali metal carboxylate, temperature and solvent used. It is necessary to determine the optimum reaction conditions for any particular case. In general, it is best to avoid reaction times and temperatures which are any greater than necessary.

It is necessary that the present invention be carried out under anhydrous conditions. For this reason, reactants and solvents should be thoroughly dried before use. If water is present in the reaction mixture, the yield of desired ester is severely decreased with concurrent formation of increased amounts of undesired olefin and other products.

The present process is equally useful with a single starting material, e.g. $CF_3(CF_2)_7CH_2CH_2I$ or $$ICH_2CH_2(CF_2)_8CH_2CH_2I$$

or with mixtures of halides, e.g. $CF_3(CF_2)_7CH_2CH_2I$, $CF_3(CF_2)_5CH_2CH_2I$ and $CF_3(CF_2)_9CH_2CH_2I$. For many uses of the product esters, particularly when preparing unsaturated esters which are useful for preparing oil and water repellents, mixtures of esters can be used and need not be separated.

The present process may be carried out in any convenient apparatus; the two requirements are that the equipment can supply the required heat and withstand the pressures developed. Batch autoclaves, sealed pressure vessels such as shaker tubes, continuously fed pressure autoclaves and the like are all useful. Removal of the insoluble alkali metal iodide or bromide formed is carried out with standard equipment, either filters or centrifuges. Distillation will require, in many cases, the use of reduced pressure.

The yields of esters obtained from the present process, when properly used, exceed 80% and often 90%. This unexpected improvement in yield is marked over that obtained using art methods as will be demonstrated in the following examples. The examples are meant to illustrate the invention but not to limit the scope thereof. Several of the examples are given to show the improvement the present process offers over the methods taught by the art. All parts are by weight unless indicated otherwise. A polymerization inhibitor is used with acrylic type esters to prevent polymerization. It is unnecessary otherwise.

Representative examples illustrating the present invention follow.

*Example I*

A mixture of 7.2 parts of 1H,1H,2H,2H-heptadecafluoro-1-iododecane, 3.4 parts of anh. potassium methacrylate, 0.1 part of hydroquinone and 25 parts of one of the alcohols shown was placed in a shaker tube which was submerged in oil and heated. The potassium iodide was then removed by filtration and the product distilled. The results follow.

| Solvent | Dielectric Constant at 25° C. | Reaction Temp., ° C. | Reaction Time, hr. | Conversion of Iodide, Percent | Yield of Ester, Percent |
|---|---|---|---|---|---|
| n-Amyl Alcohol | 14.4 | 175 | 2 | 96 | 83 |
| 1-Hexanol | 12.5 | 135 | 9.5 | 90 | 91 |
| 1-Octanol | 9.8 | 135 | 9.5 | 93 | 91 |

The product ester, $$CF_3(CF_2)_7CH_2CH_2O_2CC(CH_3)=CH_2$$

had a boiling point of 118–122° C. at 4.0 mm. Hg pressure. The olefin by-product, $CF_3(CF_2)_7CH=CH_2$, had a boiling point of 145–150° C. at 760 mm.

*Example II*

This example illustrates a preferred embodiment of the present invention.

A mixture of 7.2 parts of 1H,1H,2H,2H-heptadecafluoro-1-iododecane, 3.4 parts of anh. potassium methacrylate, 0.1 part of hydroquinone and 25 parts of tert. amyl alcohol, dielectric constant 15.60 at 25° C., was placed in a shaker tube which was submerged in an oil bath and heated for two hours at 200° C. The potassium iodide was removed by filtration and the filtrate distilled to give an 87% yield of the ester $$CF_3(CF_2)_7CH_2CH_2O_2CC(CH_3)=CH_2$$

The conversion of the iodide was >95%.

*Example III*

A mixture of 35.5 parts of 1H,1H,2H,2H-tridecafluoro-1-iodo-octane, 27.1 parts of sodium benzoate and 200 parts of tert. amyl alcohol was heated for 2 hours at 180° C. Filtration of the reaction mixture and analysis of the product indicated that the benzoate ester $$C_6H_5CO_2CH_2CH_2(CF_2)_5CF_3$$

was formed in 85% yield at 48% conversion of the iodide.

*Example IV*

A mixture of 7.2 parts of 1H,1H,2H,2H-heptadecafluoro-1-iododecane, 3.7 parts of anh. lithium methacrylate, 0.1 part of hydroquinone and 25 parts of tert. amyl alcohol was heated at 140° C. for 6 hours. Distillation, after removal of lithium iodide by filtration, gave an 81% yield of the ester $CF_3(CF_2)_7CH_2CH_2O_2CC(CH_3)=CH_2$. The conversion of the iodide was 79%.

A mixture of 7.2 parts of the same iodide as above, 4.3 parts of anh. sodium methacrylate, 0.1 part of hydroquinone and 25 parts of n-amyl alcohol was heated at 140° C. for 6 hours. The yield of the ester was 84% at 94% conversion of the iodide.

*Example V*

A mixture of 7.2 parts of the iodide used in Example IV, 3.4 parts of anh. potassium methacrylate, 0.1 part of hydroquinone and 25 parts of one of the solvents shown below was heated with the results shown below.

| Solvent | Dielectric Constant at 25° C. | Reaction Temp., ° C. | Reaction Time, hr. | Conversion of Halide, Percent | Yield of Ester, Percent |
|---|---|---|---|---|---|
| Ethanol | 24.3 | 140 | 6 | >90 | 50 |
| Tetrahydrofuran | 7.39 | 160 | 3 | >90 | 58 |
| Dimethylformamide | 37.6 | 135 | ½ | 100 | 26 |

Example V demonstrates two things. First, alcohols having dielectric constants greater than 17.5 at 25° C. give poor yields of ester even though the halide conversion is high. In other words, conversion to olefin is also high. Second, other common solvents used for converting haloalkanes to esters are frequently not useful even though they may have low dielectric constants (tetrahydrofuran=7.39).

Example VI

A mixture of 50 parts of 1H,1H,2H,2H-tridecafluoro-1-iodo-octane, 26 parts of anh. potassium methacrylate, one part of p-methoxyphenyl and 80 parts of glacial methacrylic acid was heated for 6 hours at 180° C. in a pressure vessel. The reaction mass was a thick, viscous, molasses-like liquid containing some salt. Very little monomeric material could be recovered. The solvent and product were partially polymerized.

Example VII

A mixture of 907 parts of a mixture comprising 43% $C_6F_{13}CH_2CH_2I$, 34% $C_8F_{17}CH_2CH_2I$, and 23%

$$C_{10}F_{21}CH_2CH_2I$$

(all by weight), 372 parts of anh. potassium methacrylate and 1500 parts of tert. amyl alcohol was heated in a stirred autoclave for 7 hours at 170° C. Filtration and distillation of the reaction mixture gave 690 parts of methacrylate mixture boiling between 70–150° C. at 10 mm. Hg pressure. The yield was 81%.

It is, of course, understtood that any of the previously mentioned halides $X(C_nF_{2n})CH_2CH_2Y$ can be substituted in Examples I, II, III, IV and VII to provide equivalent high yields of useful esters.

Applicant's novel process is one whereby all types of acids can be converted to esters of the type $$Z(C_nF_{2n})CH_2CH_2O_2CR$$

this is not true for the prior art methods as described; it utilizes relatively inexpensive reagents which need not be recovered (no silver). Also, the reaction is more rapid than those disclosed in the art in addition to providing significantly useful esters. These esters have a variety of uses, depending on their type. For example, unsaturated esters are useful for preparing oil and water repellents. The methacrylate esters $$F(CF_2)_nCH_2CH_2O_2CC(CH_3)=CH_2$$

where $n$ is from 6 to 12 are particularly useful for this purpose. They are polymerized with free radical catalysts to polymers which impart oil and water repellency to textiles and the like, particularly when they are applied as mixtures with non-fluorinated methacrylate polymers. They are applied in the same manner as the compositions of U.S. Patent 2,803,615.

Saturated esters have a variety of uses. For example, they can be used as solvents or reaction media. They can also be hydrolyzed to the corresponding alcohols $F(C_nF_{2n})CH_2CH_2OH$ and $$HOCH_2CH_2(C_nF_{2n})CH_2CH_2OH$$

as has been demonstrated by Park et al., J. Org. Chem., 23, 1166 (1958). The esters of polybasic acids, particularly aromatic polyacids such as phthalic, trimellitic, pyromellitic and the like, are useful as high boiling stable fluids for use as lubricants, hydraulic fluids and the like.

The preceding representative examples may be varied within the scope of the present total specification disclosure, as understood and practiced, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for converting halides having the structure $X(C_nF_{2n})CH_2CH_2Y$ to esters having the structure $Z(C_nF_{2n})CH_2CH_2O_2CR$ wherein X is selected from the group consisting of fluorine and $—CH_2CH_2Y$, Y is selected from the group consisting of bromine and iodine, Z is selected from the group consisting of fluorine and $RCO_2CH_2CH_2—$; the radical $RCO_2—$ is the residue of a member selected from the group consisting of hydrocarbon mono- and polycarboxylic organic acids free of substituents and $n$ is from one to about 16; said process comprising heating, under anhydrous conditions, the halides $X(C_nF_{2n})CH_2CH_2Y$ with alkali metal carboxylates of the formula $MO_2CR$, $RCO_2—$ has the same meaning as heretofore set forth, in an anhydrous unsubstituted monohydric hydrocarbon alcohol as solvent, said alcohol having a dielectric constant of less than about 17.5 at 25° C., at a reaction temperature of from about 125° to about 200° C., for from about one to about 30 hours under autogenous pressure and recovering the ester $$Z(C_nF_{2n})CH_2CH_2O_2CR$$

from the reaction mixture; M is an alkali metal.

2. A process according to claim 1 in which process the structure $X(C_nF_{2n})CH_2CH_2Y$ is $F(CF_2)_nCH_2CH_2I$ and $n$ is from 6 to 12.

3. A process according to claim 1 wherein the alkali metal carboxylate $MO_2CR$ is potassium methacrylate.

4. A process according to claim 1 wherein the solvent is tert.-amyl alcohol.

References Cited by the Examiner

UNITED STATES PATENTS

| | | | |
|---|---|---|---|
| 2,275,466 | 3/1942 | Pollack et al. | 260—486 |
| 2,617,820 | 11/1952 | Gamrath et al. | 260—475 |

OTHER REFERENCES

Pierce et al.: J.A.C.S. 75, 5618–5620 (1953).

LORRAINE A. WEINBERGER, *Primary Examiner.*

TOBIAS E. LEVOW, LEON ZITVER, *Examiners.*